United States Patent [19]

Ozeki et al.

[11] Patent Number: 5,121,384
[45] Date of Patent: Jun. 9, 1992

[54] INTEGRATED MULTIMEDIA NETWORK SYSTEM

[75] Inventors: Takeshi Ozeki, Kawaguchi; Toshikazu Kodama, Yokohama, both of Japan

[73] Assignee: Kabushiki Kaisha Toshiba, Kawasaki, Japan

[21] Appl. No.: 599,413

[22] Filed: Oct. 18, 1990

[30] Foreign Application Priority Data

Oct. 20, 1989 [JP] Japan .................................. 1-271796

[51] Int. Cl.⁵ ............................. H04J 3/26; H04J 3/08
[52] U.S. Cl. .................................. 370/60; 370/85.12; 370/85.15
[58] Field of Search ................. 370/94.1, 85.12, 85.15, 370/60; 340/825.05

[56] References Cited

U.S. PATENT DOCUMENTS

| | | | |
|---|---|---|---|
| 4,538,263 | 8/1985 | Gabrielli et al. | 370/94.1 |
| 4,569,041 | 2/1986 | Takeuchi et al. | 370/85.15 |
| 4,797,882 | 1/1989 | Maxemchuk | 370/94.1 |
| 4,817,088 | 3/1989 | Adams | 370/85.12 |
| 4,849,968 | 7/1989 | Turner | 370/94.1 |
| 4,881,074 | 11/1989 | Reichbauer et al. | 370/94.1 |
| 4,951,280 | 8/1990 | McCool et al. | 370/85.14 |
| 4,998,248 | 3/1991 | Matsuzaki | 370/94.1 |

FOREIGN PATENT DOCUMENTS 0353927  7/1989  European Pat. Off. .
3306750  2/1983  Fed. Rep. of Germany .

OTHER PUBLICATIONS

Kummerle, Karl: Local-Area Comminication Networks-An Overview; in: NTG-Fachberichte 80, VDE-Verlag, 1982, pp. 128-145.

Bruckner, Anette: "Daten zu Paketen schnuren"; in: Funkschau 19/1988, pp. 58-61.

Ohnishi, H., et al: ATM Ring Protocol and Performance; in: IEEE ICC 89 Conference Record, 13. 1-1, pp. 0394-1.5.

Eng, Kai Y., et al: a Knockout Switch for Variable-Length Packets; in: IEEE Journal on Selected Areas in Communication, vol. SAC-5, No. 9, Dec. 1987, pp. 1426-1439.

German periodical: Der Fernmelde-Ingenieur, vol. 41/issue 9, Sep. 1987.

Primary Examiner—Benedict V. Safourek
Assistant Examiner—Min Jung
Attorney, Agent, or Firm—Oblon, Spivak, McClelland, Maier & Neustadt

[57] ABSTRACT

An integrated multimedia network system is constructed by a plurality of transport nodes each having several types of communication media intervened at arbitrary locations in a ring-shaped transmission path. One transport node exchanges communication information of communication media in a fixed-length packet transfer format. The transport node has a packet switcher, which divides packets into plural groups for at least self node and other nodes by switching between media communication packets from the self node and those packets from an adjoining transport node based on header information that indicates their destinations. A group of packet communication information destined to the self node is sent to the associated communication medium. A group of packets for other nodes is time-divisionally multiplexed and is sent on the transmission path. The packet switcher is supplied with a time-divided multiplexing signal from an adjoining transport node to be sent over the transmission path after the signal is time-divisionally separated for each group.

6 Claims, 5 Drawing Sheets

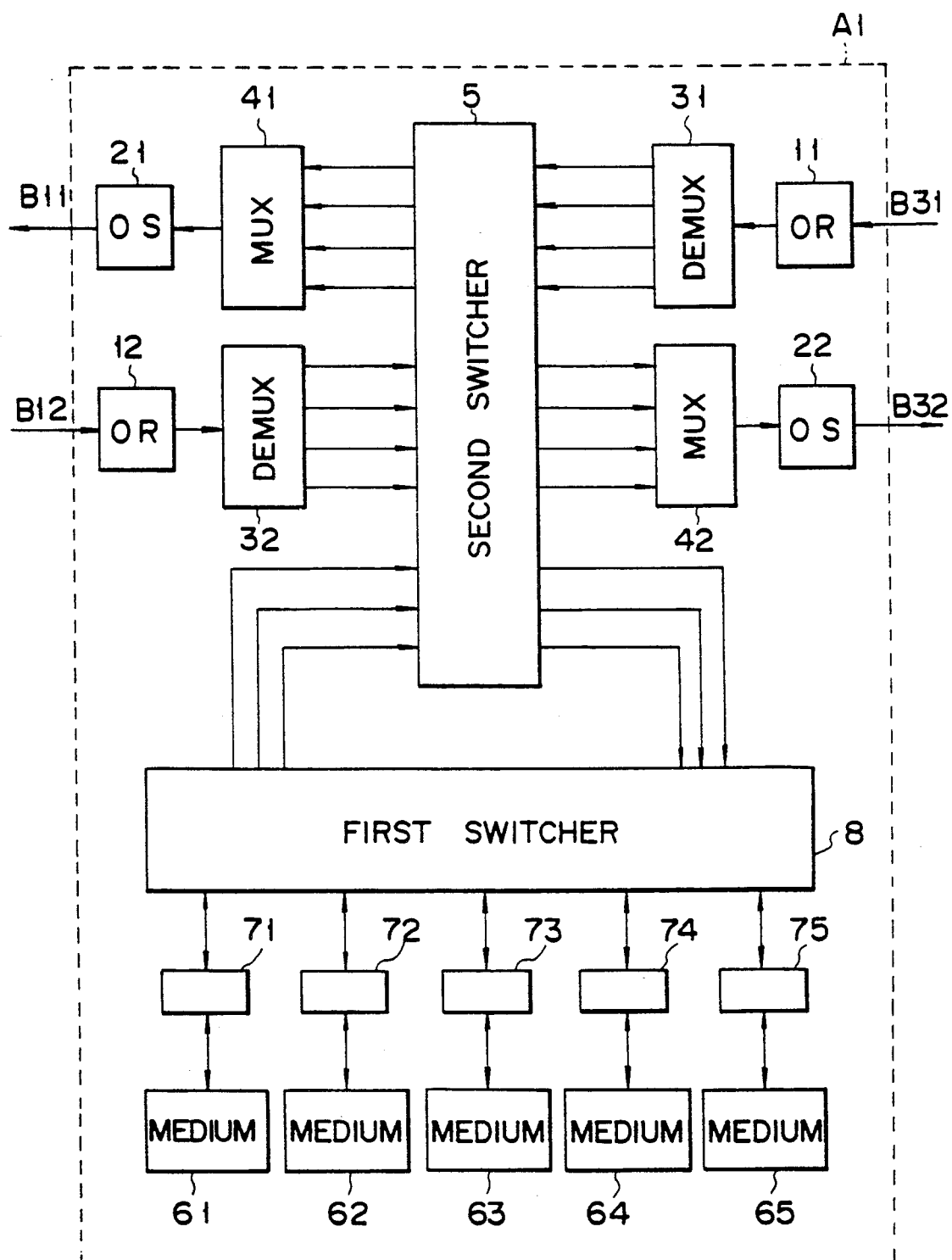
F I G. 2

INTEGRATED MULTIMEDIA NETWORK SYSTEM

BACKGROUND OF THE INVENTION

1. Field of the Invention

The present invention relates to an integrated multimedia network system which integrates transport nodes with various communication media to construct a network between transport nodes.

2. Description of the Related Art

Conventionally, as a way to constitute a wide range integrated multimedia network system, various distributive queuing networks using a bus or ring have been proposed. Particularly, a distributive queuing network using fixed-length, short packets (hereinafter referred to as "cells") has a feature that can support real-time communication of voices, video images, etc. in addition to data, and is therefore suitable for multimedia environment. Of this type of network, the DQDB system (IEEE Draft 802.6. DADB MAC, Ver. C.O., Jan. 19, 1988) has been proposed as a system using a bus, and the Orwell ring system (R. R. Falcorner et.al., Orwell, British Telecom Technol J. Vol. 3, No. 4, October 1985) as a system using rings.

The DQDB system uses bidirectional double buses, and request an empty slot by a request bit to thereby keep fair accessing to the buses. In principle, this system has asymmetrical transmission path topology. When the load on the transmission path increases, therefore, fair accessing cannot be secured. If a hybrid type having a real-time mode which involves voices or video signals, that require real-time transmission, and a non-real-time mode such as data in which real-time transmission is unnecessary, is employed, it is difficult to provide highly flexible multimedia environment.

The Orwell ring system is basically constructed by fixed-length slotted ring transmission paths. At each transport node on the transmission paths is provided a so-called "d" counter, which decrements the count every time one cell is sent out. When d cells are sent out or no transmission cells exist, each transport node stops cell transmission. When every transport node stops sending cells at last, the "d" counters are reset, which permits all the transport nodes to be ready to transmit cells again.

This system has the advantage that it gives fair accessing to the ring of each transport node. Since the Orwell ring system needs to temporarily stop transmitting cells from every transport node, however, the throughput is reduced. In addition, this system also has such a shortcoming of the conventional ring system that as the load increases, the real-time transmission cannot be secured.

Recently has been proposed an ATM (A synchronous Transfer Mode) ring system (H. Ohnishi et.al., ATM Ring Protocol and Performance," IEEE ICC 89 Conference Record, 13.1.1., p. 394), an improved Orwell ring system. Although this system improves throughput compared with the ordinary Orwell ring system, it still has difficulties to deal with the flexibility of the system under a multimedia environment and assurance of different communication qualities for different terminals.

SUMMARY OF THE INVENTION

It is therefore an object of the present invention to provide an integrated multimedia network system which can ensure flexibility of the network, and assure realtime transmission even with an increase in load as well as different communication qualities for different communication media.

According to one aspect of the present invention, there is provided an integrated multimedia network system comprising:

a transmission path formed by at least a single transmission loop; and a plurality of transport nodes intervened at arbitrary locations of the transmission path and each having several types of communication media;

the transport nodes each including, information/packet converting means, provided for each of the communication media, for exchanging media communication information in a fixed-length packet transfer format, packet switching means for receiving packets converted by the information/packet converting means and packets from an adjoining transport node, dividing the packets into plural groups for at least self node and other nodes by packet switching based on header information indicating destinations of the packets, and sending that group of packets which is destined to the self node to associated information/packet converting means, transmission means for multiplexing, on a time-divisional basis, those groups of packets which are destined to the other nodes and sending the packets on the transmission path, and receiving means for receiving a time-divided multiplexing signal sent via the transmission path from an adjoining transport node and time-divisionally separating the time-shared multiplexing signal group by group and sending a resultant signal to the packet switching means.

Additional objects and advantages of the invention will be set forth in the description which follows, and in part will be obvious from the description, or may be learned by practice of the invention. The objects and advantages of the invention may be realized and obtain by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIG. 2 is a diagram showing the structure of each transport node employed in this embodiment;

DETAILED DESCRIPTION OF THE PREFERRED EMBODIMENT

A preferred embodiment of the present invention will now be described referring to the accompanying drawings.

Figure 1:
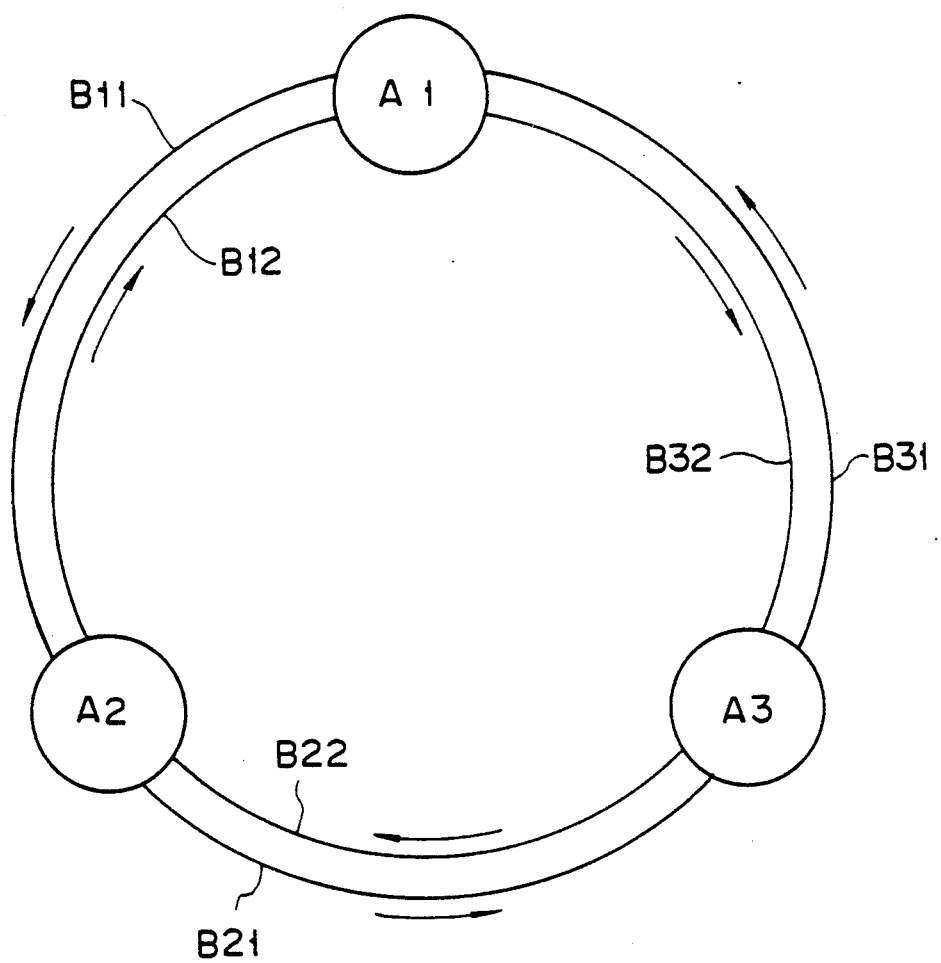
FIG. 1 is a diagram illustrating the system arrangement of this embodiment.

FIG. 1 illustrates the system structure with an ATM ring system according to the present invention. Transport nodes A1 to A3, each including several kinds of communication media, are connected to one another in a ring shape by respectively pairs of optical cables B11 and B12, B21 and B22, and B31 and B32. The optical cables B11, B21 and B31 form a first transmission loop, while the optical cables B12, B22, and B32 form a second transmission loop. These loops send optical signals in opposite directions as indicated by the arrows in FIG. 1.

FIG. 2 illustrates the structure of the transport node A1. The transport node A1 comprises first and second optical receivers (OR) 11 and 12, and first and second optical transmitters or senders (OS) 21 and 22. The first and second optical receivers receive optical signals respectively through the optical cables B12 and B31, and send them to associated demultiplexers (DEMUX) 31 and 32. The first and second optical senders 21 and 22 convert signals coming from the respective multiplexers (MUX) 41 and 42 into optical signals, and send them to the optical cables B11 and B32. The demultiplexers 31 and 32 separate the received outputs of the respective first and second optical receivers 11 and 12 into groups, and supply the groups to the second switcher 5 (to be described in detail later). The multiplexers 41 and 42 time-divisionally multiplex the four systems of transmission signals grouped by the second switcher 5 and send them to the first and second optical senders 21 and 22.

The transport node A1 includes communication media 61 to 65, such as a telephone, a terminal of an image processing device, a terminal of a data processing device, an LAN, a PBX (private branched exchange), which are connected to the first cell switcher 8 through the respective information/cell converters 71 to 75. These converters 71 to 75 serve to exchange media communication information in an ATM cell transfer format. In other words, the converters 71 to 75 convert destination information and communication information received from the communication media 61 to 65 to ATM cells, which are in turn sent to the first cell switcher 8, and extract the communication information from the ATM cells from the first cell switcher 8 and send the information to the communication media 61 to 65.

Figure 3:
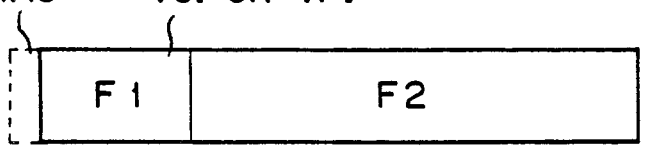
FIG. 3 is a diagram showing a format of ATM cells used in this embodiment.

As shown in FIG. 3, the format of the ATM cell consists of a header field F1 to carry destination information (header information) and an information field F2 to carry communication information. With reference to a preregistered routing table, a virtual channel identification number (VCI) to designate the destination or a virtual path identification number (VPI) is written in advance in the header field of each cell.

Figure 4A:
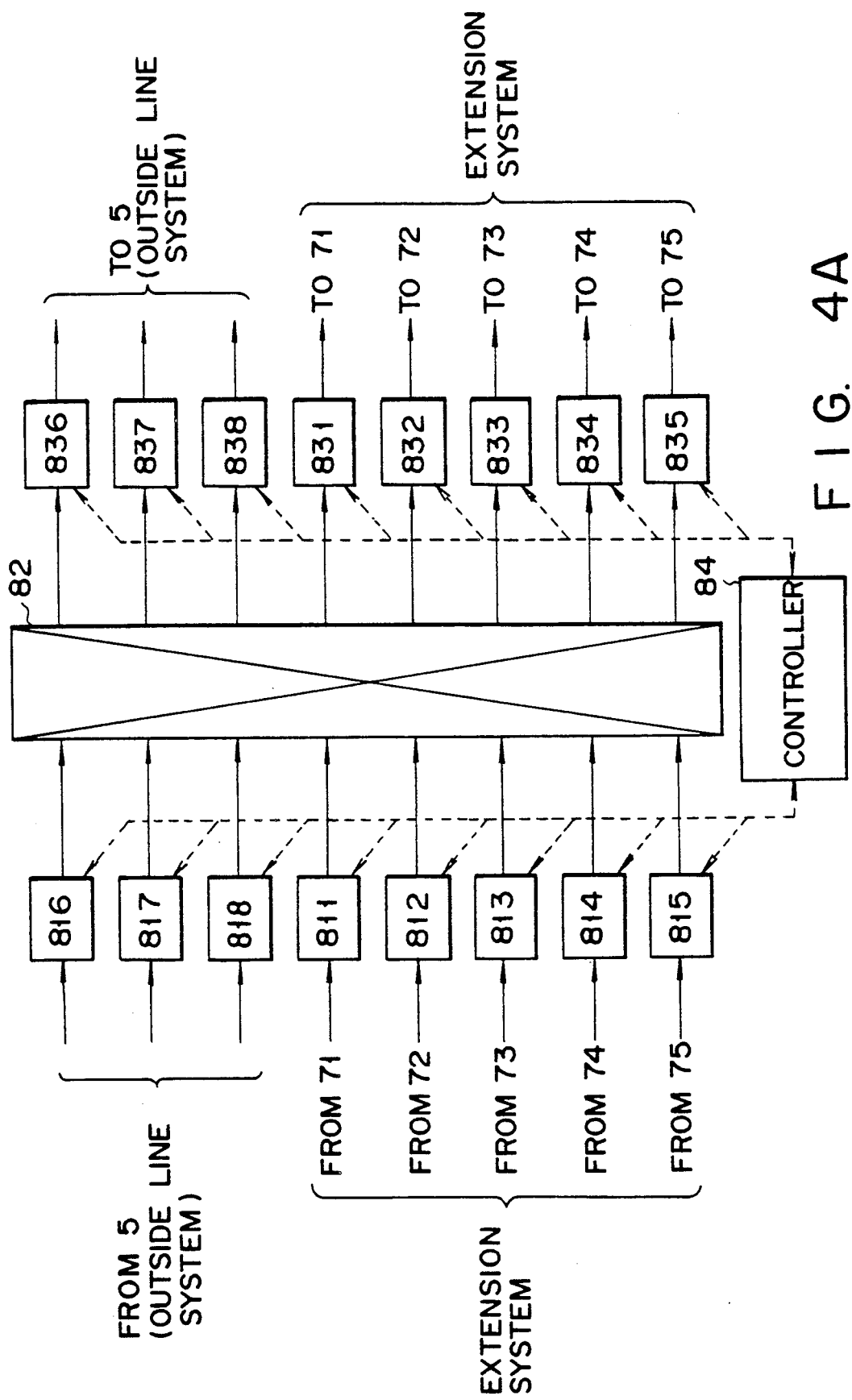
FIG. 4A is a block diagram illustrating a specific structure of a first switcher used in this embodiment.

FIG. 4A shows a specific structure of the first switcher 8. Extension preprocessors 811 to 815 send to a selfrouting switch 82 the ATM cell with a routing tag affixed to its head according to the destination (classified into an extension system and an outside line system in this case). Outside-line preprocessors 816 to 818 receive the outside-line ATM cell from the second switcher 5 (to be described later), collate the header information with the routing table, and affix a routing tag corresponding to the target system to the cell, sending the cell to a selfrouting switch 82 using a Banyan network with a buffer, for example.

Figure 4B:
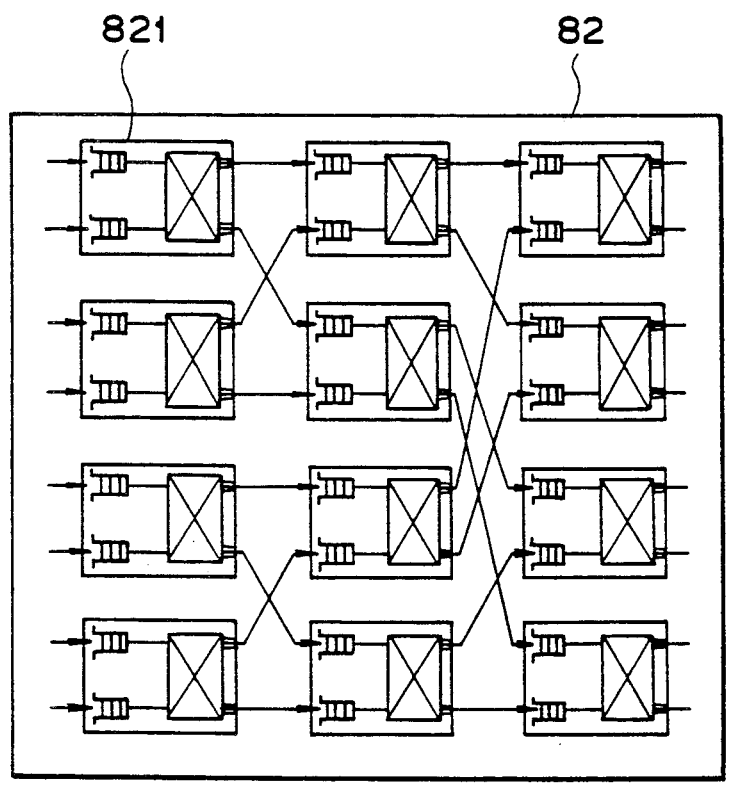
FIG. 4B is a diagram illustrating a specific structure of a selfrouting switch used in this embodiment.

As shown in FIG. 4B, the selfrouting switch 82, which has two-input, two-output unit switches 821 each with a buffer connected in multiple stages, includes an extension output system to the communication media 61 to 65 in the self transport node, and an outside line output system to other transport nodes. Each unit switch 821 sends a received cell to an output path of either system, referring to a routing tag affixed to the input cell. When there are cells simultaneously going to the same output path (in the case of cell collision), the switch 821 temporarily accumulates either one of the cells in its buffer and sends it out after the other cell is sent out.

The cell led to the extension output system by this selfrouting switch 82 is sent to postprocessors 831 to 835 of the extension system, while the cell led to the outside line output system is supplied to postprocessors 836 to 838 of the output system. The postprocessors 831 to 835 each delete the routing tag from the input cell, and send the required information to the proper communication media 61 to 65 through the information/cell converters 71 to 75. The postprocessors 836 to 838 each delete the routing tag from the input cell, and send the cell to the second switcher 5.

The first switcher 8 receives the ATM cells from the individual communication media 61 to 65 and the ATM cells from other transport nodes, and groups them for each destination and for each content of information. When the destination is in the same transport node, the switcher 8 performs the necessary extension switching (communication in the transport node). When the cells are destined to other transport node, they are sent to the second switcher 5. The processing of the preprocessors and postprocessors are controlled by a controller 84.

Figure 5:
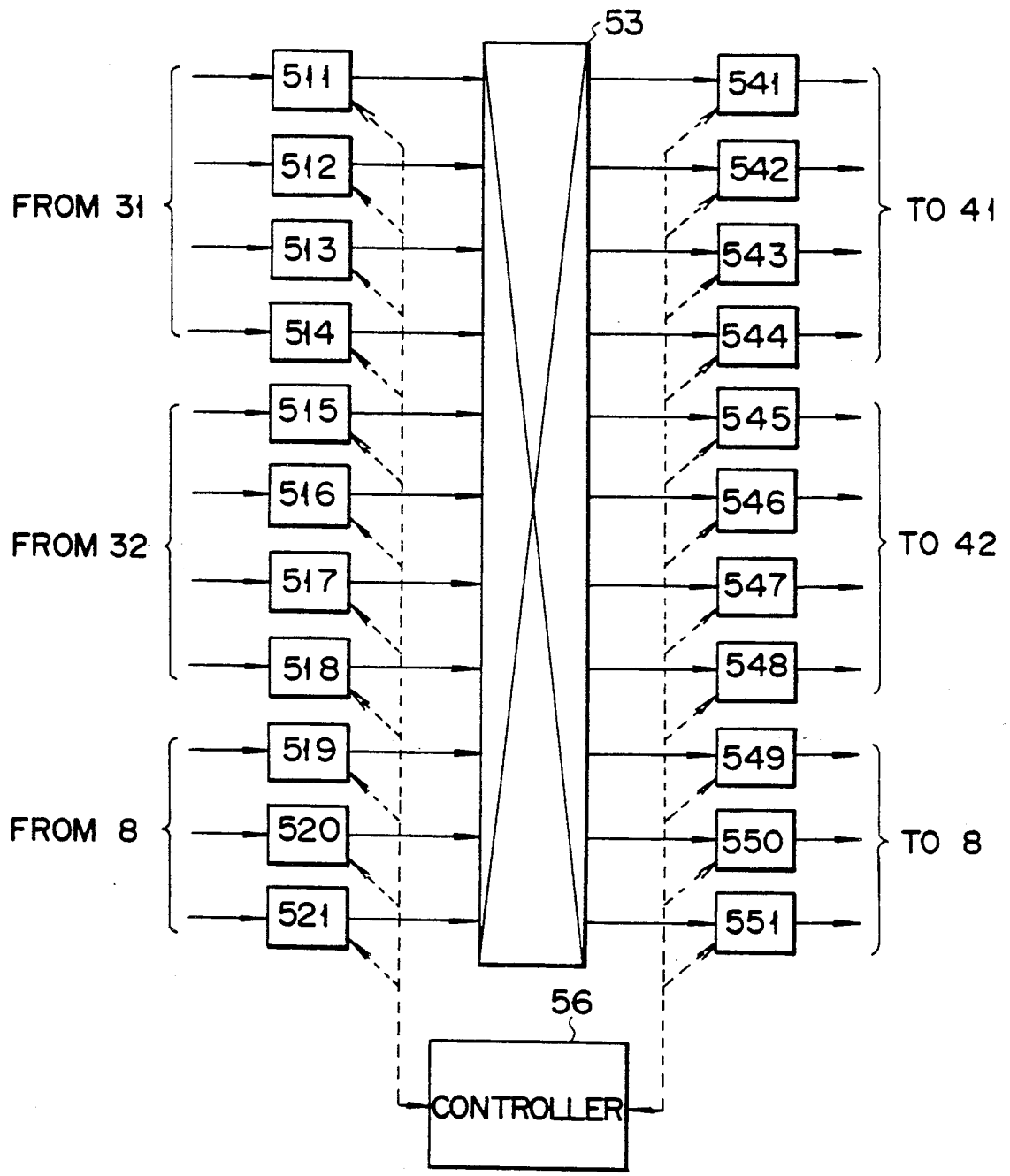
FIG. 5 is a block diagram illustrating a specific structure of a second switcher used in this embodiment.

The second switcher 5 has substantially the sam structure as the first switcher 8, as shown in FIG. 5, and comprises first and second preprocessors 511 to 514, 515 to 518 of an outside line system, preprocessors 519 to 521 of an extension system, a selfrouting switch 53, first and second postprocessors 541 to 544 and 545 to 550 of the outside line system, and postprocessors 551 to 553 of the extension system.

The first and second preprocessors 511 to 514, and 515 and 518 receive cells divided into groups by the respective demultiplexers 31 and 32, and judge whether the cells are destined to the self transport node or to other transport nodes, colating the VCI or the VPI of the header information with the routing table. The preprocessors 511–514 and 515–518 affix the routing tags to the cells according to the discrimination result, and send the cells to the selfrouting switch 53. The preprocessors 519 to 521 of the extension system receive cells from the first switcher 8, and judge the transmission destination from the header information, sending to the selfrouting switch 53 the cells with the routing tag affixed according to the discrimination result.

The selfrouting switch 53, having the same structure as the switch 82 as shown in FIG. 4B, comprises two-input, two-output unit switches each with a buffer connected in multiple stages, and includes an extension output systems (three systems) to the first switcher 8 in the self transport node and outside line output systems (4×2 systems) to other transport nodes.

Cells for the outside line output system of the self routing switch 53 are supplied to the associated postprocessors 541-544 and 545-548 of the outside line output system, and cells for the extension output system to the associated postprocessors 549-551 of the extension system. Each postprocessor removes the routing tag from the input cell before sending it out. The outputs of the first postprocessors 541-544 of the outside line output system are supplied to the multiplexer 41, while the outputs of the second postprocessors 545 to 548 of the outside line system output are sent to the mutiplexer 42. The outputs of the postprocessors 549-551 of the extension system are transferred to the first switcher 8. The operation of the preprocessors and postprocessors are generally controlled by the controller 56.

In order to execute statistical cell multiplexing, the cells to be sent to other transport nodes via the second switcher 5 are grouped for 4×2 systems, are time-divisionally multiplexed by the multiplexers 41 and 42, and are sent to the ring-shaped transmission paths B11 and B32 by the optical senders 21 and 22. On the other hand, the cells from other transport nodes are separated group by group in association with 2×4 systems, and are input to the second switcher 5.

The time-division multiplexing applied to the grouped cells allows the statistical cell multiplexing per group at the maximum. This permits the switcher in each transport node to operate at a relatively low speed and allows the cells to be connected group by group to the public network, facilitating interface matching with broadband ISDN.

As using cell switchers (the second switchers) in transport nodes which are located at proper positions on the ring-shaped transmission path, therefore, a network system with the above-described structure has a very flexible network. For example, a monitoring function to detect a failure on the transmission path may be installed in the controller 54 of the second cell switcher 5, so that a signal can be looped back using the second cell switcher 5 upon detection of a failure in an adjoining transport node, thus eliminating the need to install a special switch for loop-back as required by the prior art. Moreover, as a selfrouting switch has a buffer-priority-control function, characteristics of the network, such as a cell loss ratio and transmission delay, are controlled for each group that undergoes the statistical cell multiplexing.

This control can therefore permit communication between communication media of different communication qualities in the same network. In other words, a specific and highly flexible communication can be assured in a so-called multimedia environment which involves communication media, such as voices and video images that need real-time transmission, and communication media such as data that does not require realtime transmission.

As the above embodiment employs a cell switcher in a transport node, the transmission delay in the network may increase with an increase in the number of transport nodes on the ring. This issue can be dealt with as follows. The number of intervening transport node to be found out upon communication request is written in advance in the cell header portion, and the cell switcher in each transport node is controlled in such a way that cells are sent out in the order of a greater number of intervening transport nodes by priority. Such priority-based control can reduce a variation in transfer delay due to an increase in the number of the intervening transport nodes.

The grouping at each transport node may be conducted in such a way that cells are grouped into small groups first in accordance with the destinations before final grouping to allow cell management in units of small groups, thus further reducing the transfer delay. In addition, since the second switcher 8 and first switcher 5 have the same structure, they may be designed to be a single switcher.

As described above, the present invention can provide an integrated multimedia network system which can ensure flexibility of the network, and assure real-time transmission even with an increase in load as well as different communication qualities for different communication media.

Additional advantages and modifications will readily occur to those skilled in the art. Therefore, the invention in its broader aspects is not limited to the specific details, and representative devices, shown and described. Accordingly, various modifications may be made without departing from the spirit or scope of the general inventive concept as defined by the appended claims and their equivalents.

What is claimed is:

1. An integrated multimedia network system comprising:
    a transmission path formed by at least a single transmission loop; and
    a plurality of transport nodes intervened at arbitrary locations of said transmission path and each having several types of communication media for transmitting and receiving of communication information;
    said transport nodes each including,
    information/packet converting means, provided for each of said communication media, for exchanging said communication information from said communication media in a fixed-length packet transfer format,
    packet switching means for receiving packets converted by said information/packet converting means and packets from an adjoining transport node, dividing said packets into plural groups for at least self node and other nodes by packet switching based on header information indicating destinations of said packets, and sending that group of packets which is destined to said self node to associated information/packet converting means,
    transmission means for multiplexing, on a time-divisional basis, those groups of packets which are destined to said other nodes and sending said packets on said transmission path,
    receiving means for receiving a time-divided multiplexing signal sent via said transmission path from an adjoining transport node and time divisionally separating said time-shade multiplexing signal group by group and sending a resulting signal to said packet switching means; wherein said packet switching means comprises first switching means and second switching means,
    said first switching means receives packets transmitted from said information/packet converting means and packets from said second switching means, divides said packets into plural groups for at least self node and other nodes by packet switching based on header information indicating destinations of said packets, sends those groups of packets which are destined to said other nodes to said second switching means, and sends that group of packets which is destined to said self node to said information/packet converting means, and said second switching means received a group of packets from said first switching means and a group of packets from said receiving means, sequentially extracts packets from each group, separating said packets into plural groups for at least said self node and said other nodes by packet switching based on said header information indicating destinations, sends those groups of packets which are destined to said other nodes to said transmission means, and sends that group of packets which is destined to said self node to said first switching means.

2. A network system according to claim 1, wherein said second switching means further divides said group of packets from said first switching means and said group of packets from said receiving means into subgroups and executes packet switching in units of said subgroups.

3. A network system according to claim 1, wherein said one of said first and second switching means comprises multiple stages of selfrouting packet switches.

4. A network system according to claim 3, wherein said information/packet converting means has a function to affix priority information to a packet at a time of packet transmission, and said selfrouting packet switches has a priority control function to perform switching of that packet which has higher priority based on said priority information.

5. A network system according to claim 1, wherein said transmission path is formed by double transmission loops having opposite transmission direction, said plurality of transport nodes each comprise double systems of transmission means and double systems of receiving means in association with said double transmission loops, and said one of said first and second switching means has a function to automatically determine which system of transmission means and receiving means should be used in grouping packets in accordance with a distance to a destination.

6. A network system according to claim 5, wherein said plurality of transport nodes each have monitoring means for detecting a trouble on said transmission path, and said packet switching means has a function to automatically inhibiting packet grouping with respect to that transmission loop which has a trouble and switch grouping to that transmission loop which has no trouble, when said trouble is detected by said monitoring means.

* * * * *